April 14, 1959 — C. D. CLOSE ET AL — 2,882,037

WEIGHING MACHINE

Filed Feb. 17, 1954 — 7 Sheets-Sheet 1

INVENTORS
Charles D. Close
BY Dominic J. Rossi
John C. Williams Jr.
Harry Langsam
Attorney April 14, 1959  C. D. CLOSE ET AL  2,882,037
WEIGHING MACHINE
Filed Feb. 17, 1954  7 Sheets-Sheet 2

INVENTORS
Charles D. Close
BY Dominic J. Rossi
John C. Williams Jr.
Harry Langsam
Attorney

INVENTORS
Charles D. Close
BY Dominic J. Rossi
John C. Williams Jr.
Harry Langsam
Attorney

April 14, 1959 C. D. CLOSE ET AL 2,882,037
WEIGHING MACHINE
Filed Feb. 17, 1954 7 Sheets-Sheet 5

INVENTORS
Charles D. Close
BY Dominic J. Rossi
John C. Williams Jr.
Attorney

April 14, 1959  C. D. CLOSE ET AL  2,882,037
WEIGHING MACHINE

Filed Feb. 17, 1954  7 Sheets-Sheet 6

INVENTORS
Charles D. Close
BY Dominic J. Rossi
John C. Williams Jr.
Harry Langsam
Attorney April 14, 1959    C. D. CLOSE ET AL    2,882,037
WEIGHING MACHINE Filed Feb. 17, 1954    7 Sheets-Sheet 7

Fig. 26

INVENTORS
Charles D. Close
BY Dominic J. Rossi
John C. Williams Jr.

Harry Langson
Attorney

United States Patent Office 2,882,037
Patented Apr. 14, 1959

2,882,037

WEIGHING MACHINE

Charles D. Close, Glenside, Dominic J. Rossi, Philadelphia, and John C. Williams, Jr., Plymouth Meeting, Pa., assignors to CDC Control Services, Inc., Hatboro, Pa., a corporation of Pennsylvania Application February 17, 1954, Serial No. 410,884

4 Claims. (Cl. 265—47)

Our invention relates to weight determining devices and more particularly to fluid pressure actuated type weighing machine.

Details for a weighing platform for a weighing device is shown in the patent to John C. Williams, Jr., No. 2,802,660, granted August 13, 1957.

It is an inherent characteristic of the prior art weighing devices to have integral parts that tend to deteriorate through wear as the device is used. This deterioration often affects the accuracy of the weighing device.

It is an object, therefore, of our invention to construct a weighing machine that is devoid of parts that will deteriorate due to the wearing of the parts when the machine is in use.

Another object of our invention is to devise a weighing machine that requires only a slight movement of its operating parts to indicate the weight of the material being weighed by the machine.

Another object of our invention is to devise a weighing machine that is extremely accurate over a great range of loads.

Another object of our invention is to devise a weighing machine that has a minimum of wearing parts which are easily replaceable.

Another object of our invention is to provide an air scale weight transmitter wherein a tare weight chamber is automatically air loaded to counterbalance the fixed load on the platform so that the weight reading shows the net weight only.

Another object of our invention is to provide a weighing transmitter wherein the weight of a body or object is ascertained by the measure of the pressure which it exerts upon a confined fluid.

Another object of our invention is to provide a weight transmitter wherein the total weight on the machine is supported by metallic members should the fluid pressure become nil.

Another object of our invention is to provide a weight transmitting machine wherein the members comprising the machine are definitely positioned in spaced relationship to each other by metallic means.

Another object of our invention is to provide a weighing machine wherein uniform units can be subtracted from the machine assembly to add to or reduce the capacity of the machine.

Another object of our invention is to provide a weighing machine wherein the diaphragms of the machine are not required to support the total weight imposed on the machine.

Another object of our invention is to provide a weighing machine functioning in cooperation with an oscillation dampening device to the end that a steady reading of the fluid pressure within the machine can be obtained.

Another object of our invention is to provide a weighing machine utilizing fluid pressure and in which the members within the machine are arranged to accommodate diaphragms of rubber, phenolic product or metal.

Another object of our invention is to devise a weighing machine that will indicate the tare weight as well as a multiplicity of ingredient weights combined in a single or separately in a multiplicity of containers supported by the machine.

Another object of our invention is to provide a weighing machine that may be connected to controls to automatically weigh a multiplicity of ingredients, collected in individual containers or in a common container.

Another object of our invention is to devise a weighing machine mounted in a structural framework so constructed that a downward vertical uniform thrust is exerted on the weighing machine regardless of the position of the weight on the platform supported by the weighing machine.

Another object of our invention is to devise a weighing machine that is not affected by ambient temperatures and the condition of the surrounding atmosphere.

Another object of our invention is to provide a weighing machine that is not injured by excessive loading.

Other objects, novel features and advantages of arrangement, and construction comprehended by the invention are hereinafter more fully disclosed in the description of a preferred embodiment as illustrated in the accompanying drawings, wherein like reference characters denote corresponding parts throughout.

Referring in greater detail to the drawings wherein similar reference characters refer to similar parts, we disclose an air scale weight transmitter wherein a tare chamber is automatically air loaded to counterbalance the fixed load on a platform, another net weight chamber has air introduced therein from a constant differential pressure regulator until the pressure within the net weight chamber multiplied by the effective area of the diaphragm equals the weight on the platform. It is to be pointed out that interposed between each tare and net weight chamber there is a chamber joined to the atmosphere.

The weight determining unit, generally designated as W, comprises an upper ring member 10 and a base member 60, with an upper cylindrical body portion 20, and a lower cylindrical body portion 40 located between the upper ring member 10 and the base 60. The upper ring member 10, upper body portion 20, the lower cylindrical body portion 40, and the base 60, are held together by a plurality of bolts 11.

The weight determining unit W as illustrated, is constructed to determine the tare weight and the net weight of two ingredients. It is to be understood, however, that the weight determining units, embodying the features of our invention, can be arranged to determine the tare and net weights of one or more ingredients by eliminating or adding members to form weight determining chambers or compartments as described hereinafter; it is also to be understood that the weight determining units can be arranged to function in unison so that the capacity of the weight determining unit can be arranged to accommodate a large range of loads imposed upon the unit.

Clamped between the upper ring member 10 and the upper cylindrical body portion 20, and secured by a multiplicity of pins 12, is a tare measuring compartment upper diaphragm 21. The inner edge of said diaphragm 21 is secured by a tare disc clamping ring 13 to a tare compartment diaphragm supporting disc 15 by securing bolts 14.

A flange 22, integrally framed with upper body 20, extending inwardly from the inner surface of the cylindrical wall of the upper cylindrical body portion 20, and secured to the lower inner edge 25 of the flange 22 by a clamping ring 16 and securing bolts 17, is a tare measuring compartment lower diaphragm 24. The tare measuring compartment lower diaphragm 24 is secured to a boss 18, extending downward from the underside side of the tare compartment disc 15, by a clamping ring 46 and securing bolts 47. An entrance port 28 for fluid under pressure and a fluid pressure measuring port 29 are provided in the upper wall of the upper cylindrical body portion 20.

It will be observed from the above that the tare weight determining chamber or compartment, generally designated TW, of the weight determining unit W is defined by the tare measuring compartment upper diaphragm 21, the tare compartment disc 15, the upper inner wall of the upper cylindrical body portion 20, the inner flange 22 of the upper cylindrical body portion, and the lower diaphragm 24.

It also will be observed that when fluid under pressure is introduced, by way of the fluid inlet 28, into the tare weight determining compartment TW that a greater force, on the surfaces comprising the tare weight determining compartment TW, will be exerted in an upward component against the under side of the tare measuring compartment upper diaphragm 21 and the tare compartment disc 15 than will be exerted downward against the tare measuring compartment lower diaphragm 24, resulting in a measurable upward thrust against the downward thrust occasioned by the center members of the weight determining unit, including any structural or other members attached thereto, and the container or containers supported by the weight determining unit and arranged to receive the ingredients to be weighed.

The ingredient A weight determining compartment, generally designated AW, is comprised of an upper diaphragm 41 which is clamped between the upper cylindrical body portion 20 and lower cylindrical body portion 40 and secured by a multiplicity of pins 12. The inner edge of said diaphragm 41 is secured by an ingredient A weight determining compartment disc 35 by securing bolts 34. Extending inwardly from the inner surface of the wall of the lower cylindrical body portion 40 is a flange 42, secured to the lower edge 45 of said flange 42 by a clamping ring 36 and bolts 37, is an ingredient A weight determining compartment lower diaphragm 44, said diaphragm 44 is secured to a boss 38 that extends downward from the underside of the disc 35 by a clamping ring 66 and bolts 67. An entrance port 48 for fluid under pressure and a fluid pressure measuring port 49 are provided in the upper wall of the cylindrical lower body portion 40.

An upwardly extending boss 39, an integral part of the disc 35, is arranged to abut the underside of the downwardly extending boss 18 on diaphragm disc 15 so that definite space relationship is maintained between the diaphragm disc 15 and diaphragm disc 35.

It will be observed from the above, that the ingredient A weight determining compartment, generally designated AW, of the weight determining unit W is defined by the upper diaphragm 41, the disc 35, the upper walls of the lower cylindrical body portion 40, the inner flange 42 of the body portion 40, and the lower diaphragm 44; it will also be observed that when fluid under pressure is introduced, by way of the fluid inlet 48, into the ingredient A weight determining compartment AW that a greater force, exerted against the surfaces comprising the compartment AW, will be exerted in an upward component against the underside of the disc 35 and upper diaphragm 41, then will be exerted downward against the ingredient A weight determining compartment lower diaphragm 44, resulting in an upward measurable thrust against the downward thrust occasioned by the weight of the ingredient A as it is added to the container C supported by the machine.

The ingredient B weight determining compartment, generally designated BW, is comprised of an upper diaphragm 61, said diaphragm is clamped between the lower cylindrical body portion 40 and the base portion 60 of the machine, and is secured by a multiplicity of pins 12.

The inner edge of said diaphragm 61 is secured by a clamping ring 53 to an upper disc 55 by securing bolts 54. The wall 62 and circular side walls of the base member 60 complete the B ingredient weight determining compartment BW of the machine W. An upwardly extending boss 59, an integral part of the diaphragm disc 55, is arranged to abut the underside of the downwardly extending boss 38 on the diaphragm disc 35 so that definite space relationship is maintained between the diaphragm disc 35 and diaphragm disc 55. A downwardly extending boss 58 on the disc 55 is arranged to be slightly above an upwardly extending boss 57 when the machine is at rest. The arrangement of the boss 58 and boss 57 prevent distortion of the diaphragms within the machine should excessive weight force the center units downward. An entrance port 68 for fluid under pressure, and a fluid pressure measuring port 69 are provided through the wall of the base portion 60.

It will be observed from the above that the ingredient B weight determining compartment, generally designated BW, of the weight determining unit W is defined by the upper diaphragm 61, the disc 55, the walls of the base portion 60 and the wall 62; it will also be observed that when fluid under pressure is introduced by way of the fluid inlet 68, into the ingredient B weight determining compartment BW that pressure will be exerted against the disc 55 and diaphragm 61, resulting in an upward force that will react against the downward thrust created by the weight of ingredient B.

In the embodiment illustrated, the central units of the machine W are secured into a single unit by a through bolt 26 and a complementary spanner nut 27. Affixed to the upper disc 15 by bolts 19, is a thrust transmitting unit 23. At the end of integral radial arms 30 on the thrust unit 23 are adjustment screws and nuts 31, positioned so that their lower ends abut the upper surface of the upper ring member 10 of the machine W. When the machine is at rest, these adjustment screws 31 are positioned so that their lower ends are just clear of the upper surface of the ring 10.

Disposed laterally between the tare weight determining compartment TW, and the ingredient A weight determining compartment AW is an atmospheric compartment, generally designated A1. The atmospheric compartment A1 is defined by the diaphragm 24, the inwardly extending flange 22 of the upper cylindrical body portion 20, the lower cylindrical wall of the upper body portion 20, the diaphragm 41, and the upper surface of the disc 35, the compartment A1 is open to the atmosphere by way of the port 32.

Disposed between the ingredient A weight determining compartment AW and the ingredient B weight determining compartment BW, is an atmospheric compartment, generally designated A2. The atmospheric compartment A2 is defined by the diaphragm 44, the inwardly extending flange 42 of the lower cylindrical body portion 40, the lower cylindrical wall of the lower body portion 40, the diaphragm 61, and the upper surface of the disc 55; the compartment A2 is open to the atmosphere by way of the port 52.

Figures 2, 3:
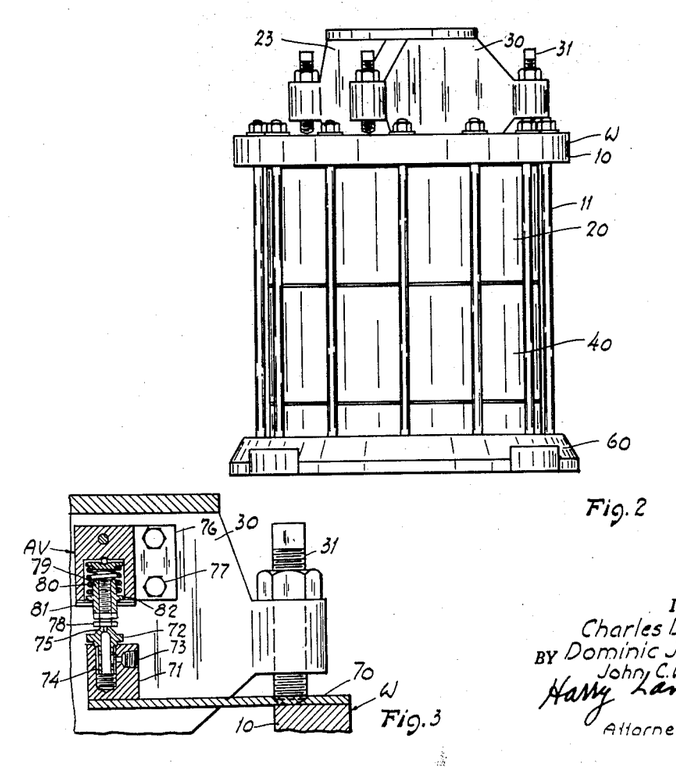
Fig. 2 is an elevational view of the weighing machine.
Fig. 3 is a cross sectional view of the fluid pressure release valve of the weighing machine.

A fluid pressure release valve or baffle nozzle arrangement, generally designated AV, illustrated in Fig. 3, is connected to the discharge outlet 29 of the tare weight chamber and is supported and definitely positioned by a support member 70 secured to the fixed upper ring 10 of the machine W. The upper portion of the valve AV is affixed to the thrust transmitting unit 23 of the machine W. The fluid pressure release valve AV is comprised of a lower body portion 71 in which is positioned an orifice unit 72. The lower body portion 71 is provided with a port 73 and cavities so arranged that fluid under pressure entering the port will find its way to a central cavity 74 and thus to the orifice 75 of the valve. The upper body portion 76 of the valve AV is secured to the thrust transmitting unit 23 of the machine W by the securing bolts 77. Positioned and secured by the upper body portion 76 is an adjustable valve seat 78, mounted upon a threaded unit 79 that is positioned in the upper body portion by a spring 80 and a plate 81 that engage a flange 82 on the threaded unit 79. The arrangement of the valve units illustrated permits accurate adjustment of the valve seat 78 over the valve orifice 75 and also prevents injury to the valve should the body portions of the valve be forced closer together due to faulty adjustment of the screws 31.

Figure 5:
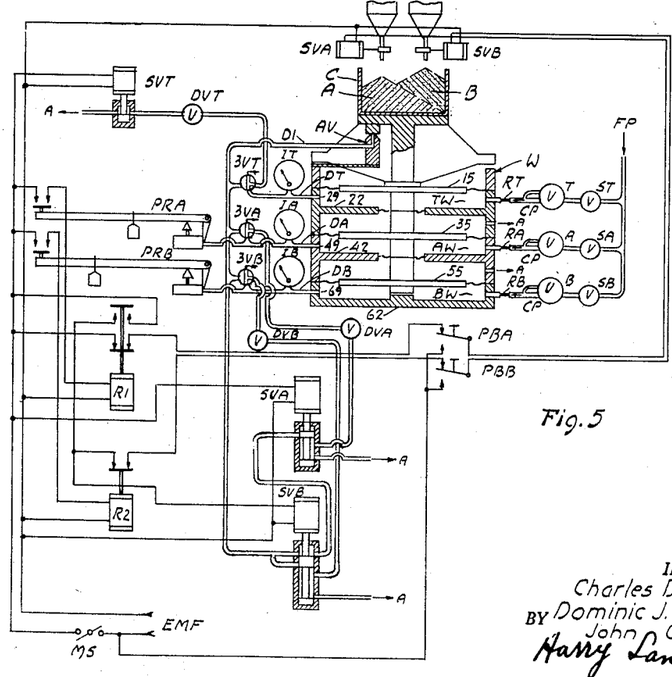
Fig. 5 is an electric wiring and piping diagram showing a diagrammatic cross section of the weighing machine and the connected devices used when the machine is set up to automatically weigh two ingredients in a single container.

One of the many applications of the weight determining unit W to the automatic weighing of ingredients is illustrated in Fig. 5. In the application illustrated in Fig. 5, the weight determining unit is arranged with the required auxiliaries to automatically weigh two ingredients A and B deposited into a single container C; a description of the operation is as follows:

(It is assumed that the containers into which the ingredients A and B are deposited are of the same weight, resulting in a constant tare weight for each quantity of the ingredients weighed.)

Fluid, compressible in nature, enters the piping system at FP and electrical energy enters the wiring system at E.M.F.

In order to set the machine up for automatic weighing of two ingredients into containers of equal weight, the operator rotates the three-way valve 3VT so that the discharge pipe DT from the tare weight determining compartment TW is connected to the discharge pipe D1 which, in turn, is connected to the automatic valve AV mounted on the machine. The operator then opens the supply valve ST, this permits fluid pressure to enter the tare weight determining compartment TW by way of the constant pressure valve CPT and restriction RT. The restrictions in the supply pipes to the weight determining compartments TW, AW, and BW of the machine are of such a size that no pressure is built up in the respective compartments when the discharge orifices 29, 49, and 69 are connected to atmospheric discharges indicated as A. As the tare weight discharge orifice 29 is now connected to the automatic valve AV, as at 73, some resistance to escape of the fluid pressure is presented causing a build up of fluid pressure in the compartment TW. This pressure causes the diaphragm disc 15, as well as all members connected to the central portion of the machine, to rise, when this occurs the valve seat 78 moves away from the orifice 75 of the automatic valve AV and permits a limited escape of the fluid pressure in the compartment TW; a balance is soon established between the fluid pressure entering the compartment TW and the fluid pressure released from the compartment TW by way of the automatic valve AV; the resulting pressure in the compartment TW is directly proportional to the tare weight imposed upon the machine and can be read on the indicator IT which is calibrated to indicate tare weight in pounds. The operator now closes the discharge valve DVT, rotates the three-way valve 3VT so that it is in position illustrated with the discharge orifice blocked. He then adjusts the constant pressure valve CPT so that the reading on the indicator IT reads the same as it read when the discharge was connected to the automatic valve AV. The tare weight determining compartment is now set for automatic operation. The operator sets up the ingredient weight determining compartment AW by rotating the three-way valve 3VA so that the discharge pipe DA from the compartment AW is connected to the discharge pipe D1 which in turn is connected to the automatic valve AV mounted on the machine. The operator then opens the supply valve SA. This permits fluid under pressure to enter the compartment AW by way of the constant pressure valve CPA and restriction RA. As the discharge orifice 49 is now connected to the automatic valve AV, some restriction to escape of the fluid pressure is presented, causing a build-up of fluid pressure in the compartment AW. This causes the diaphragm 35, as well as all the members connected to the central portion of the machine, to rise. When this occurs, the valve seat 78 moves away from the orifice 75 of the automatic valve AV and permits a limited escape of the fluid pressure in the compartment AW. The operator now presses the push button PBA to energize the solenoid valve SVA and thereby discharge a quantity of the ingredient A into the container C. The added weight forces the central portion of the machine down and tends to force the valve seat 78 of the automatic valve AV down on to the orifice 75 of the automatic valve; this construction to the free passage of fluid pressure increases the fluid pressure in the compartment AW. This increase of fluid pressure in the compartment AW is indicated on the indicator IA which is calibrated in pounds, a balance between the downward thrust caused by the weight of ingredients A in the container C and the upward force created by the fluid pressure in the compartment AW is established for all quantities of ingredient A in the container C. When a predetermined quantity of ingredient A has been deposited in the container C, the operator de-energizes the solenoid valve SVA. He then closes the discharge valve DVA and rotates the three-way valve 3VA to the position shown in the illustration with the discharge orifice blocked. He then adjusts the constant pressure valve CPA so that the reading on the indicator IA reads the same as it did when the discharge orifice was connected to the automatic valve AV. He also adjusts the pressure actuated relay PRA so that contact is made at the contact points at the indicated pressure.

The operator now goes through the same procedure manipulating corresponding controls for the compartment BW to add a predetermined quantity of the ingredient B to the container.

After the pilot adjustment has been made, the discharge valves DVT, DVA, and DVB are opened, relieving all pressure on the compartments TW, AW, and BW.

The machine is now ready for repeated weight proportioning of the ingredients A and B into containers of equal weight. The automatic operation is as follows:

A standard container is placed on the machine platform, master switch MS is closed, solenoid valve SVT is energized, and a predetermined pressure, enough to balance the tare weight, is quickly built up in the compartment TW. At the same time, solenoid valve SVA is energized to permit ingredient A to flow into the container C, also solenoid valve SVA1 is energized to connect the discharge orifice of the AW compartment of the machine to the automatic valve AV by way of the solenoid valve SVB1. As ingredient A is deposited into the container C, the central portion of the machine forces the valve seat 78 down onto the orifice 75 of the automatic valve AV. When the weight of ingredient A creates a downward thrust on the central portion of the machine, and an equal upward thrust is established in the compartment AW by fluid under controlled pressure entering the compartment AW by way of the supply constant pressure valve CPA; the pressure thus created is impressed on the pressure relay PRA and when the predetermined weight of the ingredient A in the container C and the counter balancing pressure is built up in the compartment AW the relay PRA contacts make, energizing relay R1. When relay R1 is energized, it disconnects the solenoid valve SVA which stops the flow of ingredient A into the container; also when relay R1 is energized, the contacts of the relay R1 close to supply energy to open the solenoid valve SVB and permit ingredient B to flow into the container C, relay R1 contacts also supply energy to energize solenoid SVB1 blocking the discharge pipe from the orifice 49 of the compartment AW and connecting the pipe from the discharge orifice 69 of the compartment BW to the automatic valve AV. The increasing weight of ingredient B, deposited in the container C, creates downward thrust on the central portion of the machine, which, in turn, forces the valve seat 78 down onto the orifice 75 of the automatic valve AV. When the predetermined weight of the ingredient B creates a downward thrust on the central portion of the machine, and an equal upward thrust is established in the compartment BW by fluid under controlled pressure entering the compartment BW by way of the supply constant pressure valve CPB. The pressure thus created is impressed on the pressure relay PRB and when the predetermined weight of the ingredient B in the container C and the counter-balancing pressure is built up in the compartment BW, the relay PRB contacts make, energizing relay R2. When relay R2 is energized, it disconnects the solenoid valve SVB, which stops the flow of ingredient B into the container C.

The filling operation complete, the operator now opens master switch MS. The opening of the master switch MS disconnects solenoid valve SVT, SVA1, and SVB1 coil, allowing the armatures of these coils to return the valves to the de-energized position, as illustrated. The return of these valves to a de-energized position causes connections in the pipes connected to the discharge orifices of compartments TW, AW, and BW, to be set up so that the fluid pressure in the compartments is discharged to the atmosphere and all upward force is removed from the central portion and connected diaphragms and pressure discs of the machine. The machine is now in a de-energized and pressure relieved condition, and the cycle is completed. The operator removes the container with ingredients from the platform of the machine, placing an equal weight container on the platform for a second cycle.

Figure 22:
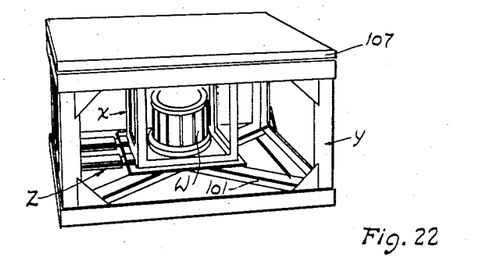
Fig. 22 is a perspective view of the weighing machine, its supporting frame, and a weighing platform.
Figure 23:
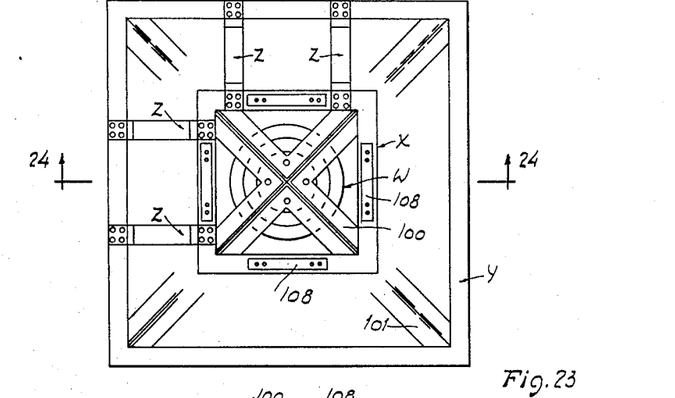
Fig. 23 is a plan view of the weighing machine and frames shown in Fig. 22 with the weight supporting platform removed.
Figure 24:
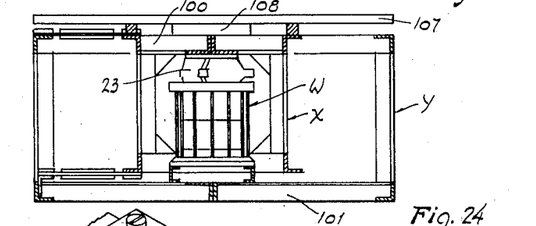
Fig. 24 is a cross-sectional view of the weighing machine and supporting and supported frame, taken along line 24—24 of Fig. 23.
Figure 25:
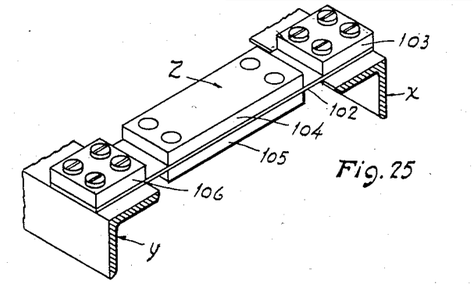
Fig. 25 is an isometric view of a flexible connecting member used between upper and lower members of the supporting and supported frames.

In certain applications employing the weight determining unit W, it is necessary to employ a relatively large weighing platform. In such applications, the unit W is mounted within a structural framework, generally designated as X, in the shape of a parallelepiped, as illustrated in Fig. 22, which is, in turn, mounted within a second structural framework, generally designated as Y, also in the shape of a parallelepiped. Cross members 100, at the top of the inner structural framework X, rest on and are supported by the thrust transmitting unit 23 of the machine W, while cross members 101 at the bottom of the outer structural framework Y, support the machine W. Definite vertical space relationship between the structural framework X and structural framework Y is maintained by flexible units, generally designated as Z. The flexible members Z are arranged to offer little or no resistance to a limited vertical movement of the central structural framework X, and at the same time, they definitely resist horizontal movement of the central structural framework X within the outer structural framework Y. The flexible units Z are illustrated in Fig. 25 and are comprised of a center flexible member 102 reinforced to resist lateral thrust on the unit by the upper 104 and lower 105 plates. The ends of the flexible unit Z are securely affixed to the horizontal angle structural members of the outer structural frame Y and the inner structural frame X by clamping blocks 106 and 103 respectively. Pairs of flexible members Z are positioned on adjacent sides and between the inner structural frame X and outer structural frame Y as illustrated in Fig. 23 and Fig. 24, two at the top and two at the bottom, between adjacent sides of the structural framework X and structural framework Y. A plate 107, secured to the top of the inner structural framework X with spacer blocks 108 interposed between the plate 107 and the inner framework X, is arranged to receive the product to be weighed. With the arrangement as described above, of the weight determining machine W in relation to the inner framework Y and outer framework X, and spacing units Z, any downward thrust occasioned by the placing of a product or article on the plate 107, regardless of the position of the product or article on the plate, is resolved into a vertical downward thrust on the weight determining machine, any side or unbalanced thrusts set up by the non-central location of the article or product on the plate 107 is resolved into horizontal thrusts that are resisted by the flexible members Z. As the flexible units resist horizontal thrust only all the vertical thrust created by the article or product on the plate 107 is transmitted to the weight determining machine W by the upper cross members 100 of the inner structural frame X as a vertical downward thrust.

It is our desire to point out, and as will be apparent from the above description, that it is only necessary for the central portion of the machine to rise a few thousandths of an inch to enable the machine to accurately evaluate the weight of the product or article supported by the machine.

Figure 1:
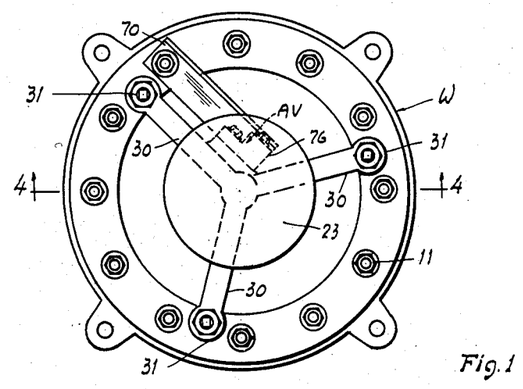
Fig. 1 is a plan view of the top of a weighing machine embodying the features of our invention.
Figure 4:
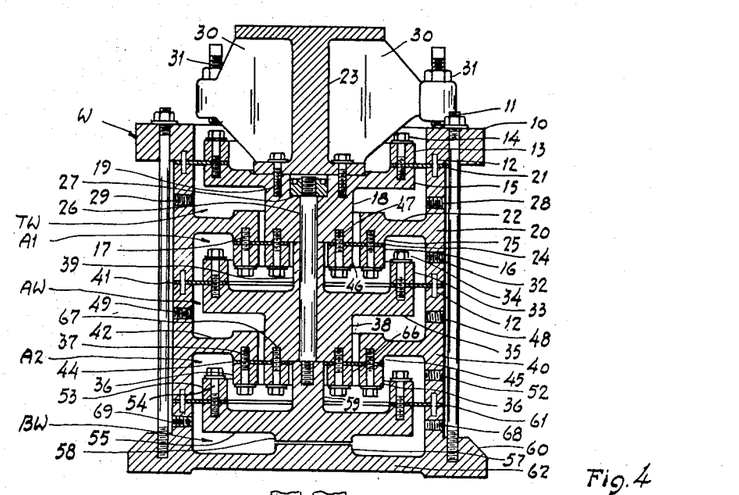
Fig. 4 is a cross sectional view of the weighing machine taken along line 4—4 of Fig. 1.
Figures 6, 7, 8:
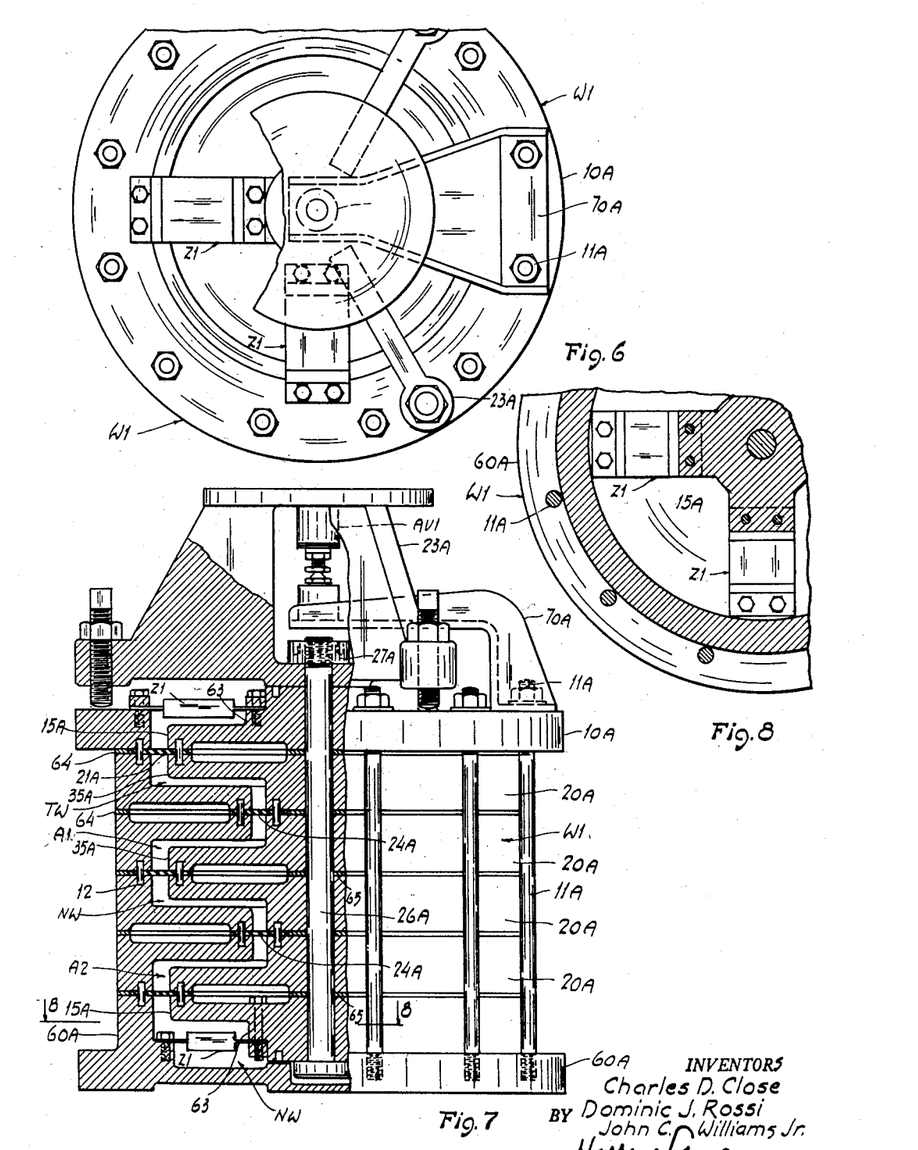
Fig. 6 is a plan view of a modified form of our weighing machine, this machine of unit construction and has incorporated therein, radial positioning members.
Fig. 7 is a partially sectioned elevational view of our modified weighing machine.
Fig. 8 is a fragmental sectional view taken at line 8—8 of Fig. 7.

In Figs. 6, 7, and 8, is illustrated a modified form of our weight determining unit, generally designated W1. This weight determining unit is substantially the same as the weight determining unit W illustrated in Figs. 1, 2, and 4. It is unique in that the units comprising the compartments and diaphragm support members are of identical unit type construction, that the spacing of the units is by metal spacers, and that the radial thrust units Z1 are an integral part of the machine. In the weight determining unit W1, the automatic fluid pressure control valve AV1 is centrally located to insure more positive and accurate operation of the valve AV1.

In the weight determining unit W1, the upper ring member 10A and base member 60A have clamped between them body portions 20A that define upper, lower, and outer surfaces of the atmospheric and weight determining compartments. The units in order to accomplish this defining function are reversed in successive order, as illustrated in Fig. 7. The base member 60A interfits with one of the body portions 20A to define the lower surfaces of the lower weight compartment. The unit 10A, multiple units 20A, and base portion 60A, are clamped together by the tension bolts 11A. Definite space relationship between the units 10A, 20A, and 60A is established by the metal spacer rings 64. The metal spacer rings 64 insure definite metallic spacing of the units 10A, 20A, and 60A, and are of a thickness to insure positive clamping of the diaphragms 21A and 24A that are positioned between these units; and at the same time prevent excessive loads on the diaphragms during the assembly of the unit and while the weight machine W1 is in service. The diaphragms are further secured by a multiplicity of pins 12. The body portions 20A also position and secure the outer edge of the diaphragms 24A which are positioned between the successive atmospheric and tare and weight determining compartments of the machine. The diaphragms 24A are also further secured by a multiplicity of pins 12.

The inner edges of the diaphragms 21A and 24A, are secured by the central disc members 15A and 35A. The discs 15A are identical in construction and are arranged to clamp the inner edges of the diaphragms 21A. The central disc members 15A have bosses 63 to which are attached the inner ends of the radial thrust units Z1. The discs 35A are identical in construction and are assembled in reverse order; their outer edges are arranged to secure the inner edge of the diaphragms 21A and an inner boss is arranged to secure the diaphragms 24A. The diaphragms 21A and 24A are further secured by a multiplicity of pins 12. Definite space relationship between the discs 15A and 35A is established by the metal spacer rings 65. The metal spacer rings 65 insure definite metallic spacing of the units 15A and 35A and are of a thickness to insure positive clamping of the inner edges of the diaphrams 21A and 24A, that are positioned between the central disc units, and at the same time, prevent excessive loads on the diaphragms during the assembly of the units and while the weight machine W1 is in service.

The center assembly of the weight machine W1 together with the upper thrust transmitter unit 23A, are firmly held together by the through bolt 26A and spanner nut 27A.

Vertical movement of the central assembly of the weight machine W1 without radial movement, is assured by the integral thrust units Z1. The lower radial thrust units provide for definite radial spaced relationship between the lower disc member 15A and the base unit 60A, and the upper radial thrust unit 21 provides for definite spaced relationship between the upper disc member 15A and the upper ring member 10A. Although the radial thrust units Z1 do not permit side movement of the central portion of the weight machine, they do not hinder limited vertical movement of said central portion. The radial thrust members Z1 function in pairs, the units being disposed at right angles to each other as illustrated in Figs. 6 and 8.

Figure 17:
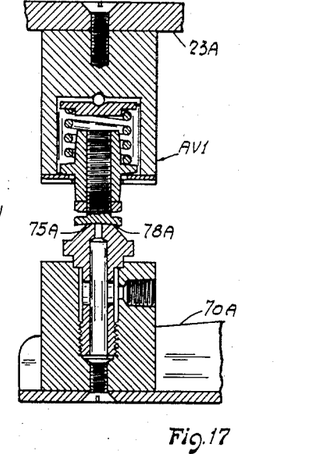
Fig. 17 is a sectional elevational view of a modified form of the fluid pressure regulating valve.

In the embodiment of our invention illustrated in Figs. 6, 7, 8, and 14, the fluid pressure regulating valve AV1 is centrally positioned in the machine. The valve AV1 is so positioned to provide for more accurate functioning of the valve. When the air valve is applied to weight machines that are not provided with radial thrust units, the valve seat 78A is arranged to be slightly concave and the surface area 75A around the valve orifice is slightly convex, as illustrated in Fig. 17; the curvature of the two surfaces are such that slight misalignment of the central portion of the weight machine will not affect the proper functioning of the fluid pressure regulating valve or baffle nozzle arrangement AV1.

Figures 9, 10, 11, 12, 13:
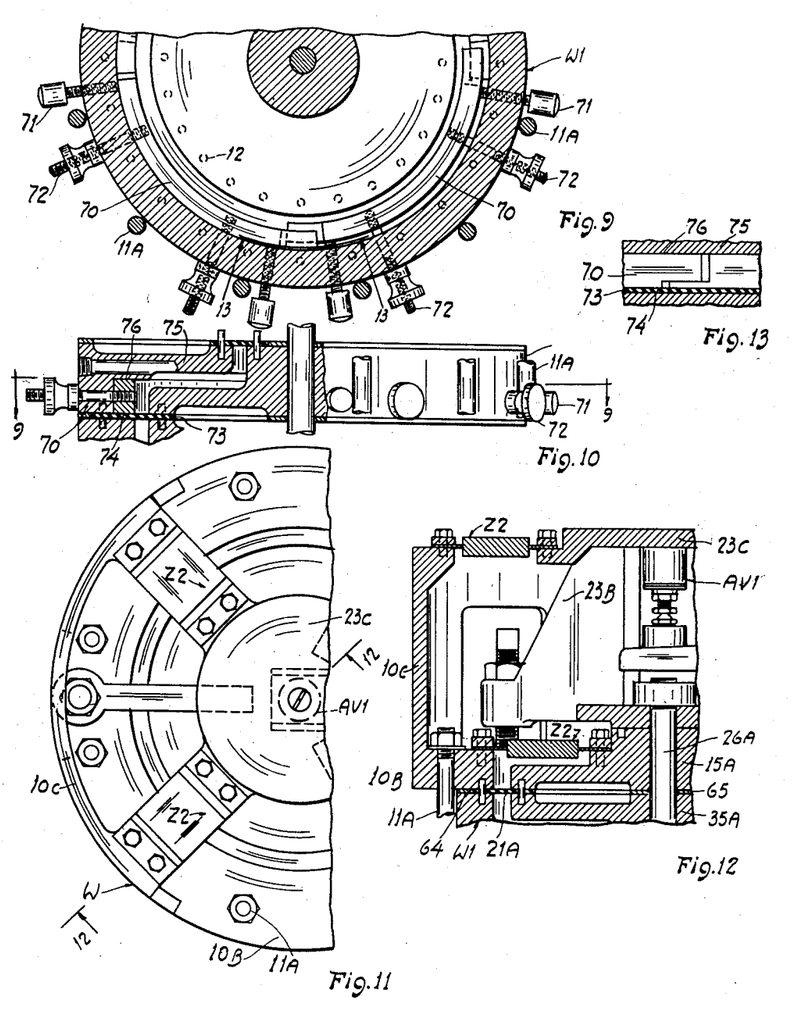
Fig. 9 is a fragmental sectional view taken at line 9—9 of Fig. 10.
Fig. 10 is a fragmental sectional view of a modified form of the atmospheric chamber of our modified weighing machine showing adjustably positioned segments arranged to modify the upward force exerted by the diaphragm.
Fig. 11 is a fragmental plan view of a form of our weighing machine wherein the radial positioning members are all positioned exterior of the fluid pressure chambers.
Fig. 12 is a fragmental sectional view taken along line 12—12 of Fig. 11.
Fig. 13 is a fragmental sectional view taken along line 13—13 of Fig. 9.

In certain applications of the thrust units, it has proven to be advisable to have all the thrust units in an exposed positioning of the thrust units is illustrated in Figs. 11 and 12. In the application of the thrust unit as illustrated in Figs. 11 and 12, a partial cylindrical upward extension 10C, is arranged to have the outer ends of the upper radial thrust units Z2 attached thereto, while their inner ends are securely attached to the upper disc 23C of the thrust unit 23B; thereby providing definite spaced relationship between the upper end of the extension 10C and the disc 23C. The lower thrust units Z2 are arranged to provide definite spaced relationship between the central unit of the machine and the clamping ring 10B.

In certain applications of the weight machines; such as, where two weight machines are used to determine the weight of a given load, it has been found desirable to have means within the weight machines whereby the upward thrust on the central portion of the machine with a given fluid pressure is equal to the upward thrust of the central portion of a companion machine. When two or more machines are cooperating to measure a given weight in this manner, it has been found desirable to have a means for calibrating the upward thrust of the diaphragms within the machine. A means to accomplish such calibration of the diaphragms is illustrated in Figs. 9 and 10. In this embodiment, movable segments 70 are provided in the atmospheric pressure compartments of the machine. The segments 70 are arranged so that they can be definitely positioned in radial spaced relationship by the adjustable compression screws 71 and adjustable tension screws 72. The screws 21 are compression screws that move the segments toward the center of the machine, while the tension screws 72 and associated nuts secure the segment after its position has been established by the compression screws 71. One or more of the adjustable segments 70 can be moved to obtain the desired calibration.

The function of the diaphragm calibrating means is as follows: When the weight machine is fluid pressure loaded, the upward thrust of the diaphragm 73 is exerted against the underside 74 of the segment 70, reaction to this upward thrust is provided by the inwardly extending flange 75, a finished surface 76 on the underside of the flange 75 being arranged to engage the top surface of the segment 70. As the segment 70 is moved in or out, the effective area of the diaphragm 73 is reduced or increased. In this way the upward thrust of the diaphragm on the central portion of the machine is, in a limited extent, controllable by the segments 70, and the upward thrust of a given fluid pressure in the machine can be regulated. The overlapping of the segments 70 to provide relatively uniform contact between the underside 74 of the segment and the upper surface of the diaphragm 73 is illustrated in Fig. 13.

Figures 14, 14A, 14B:
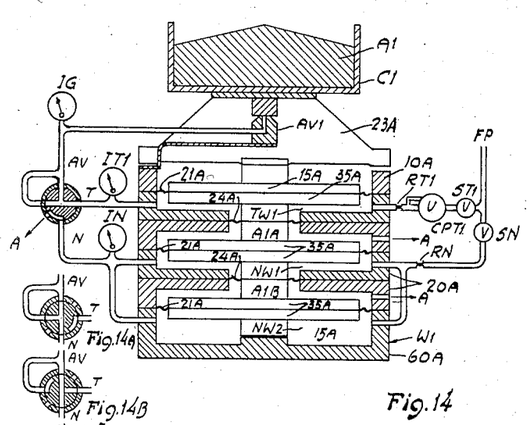
Fig. 14 is a diagram of piping connection to our unit type weighing machine.
Fig. 14A is a diagram showing the position of a three-way valve when net weight is being determined.
Fig. 14B is a diagram showing the position of a three-way valve when gross weight is being determined.

A diagram showing the piping and valve connections as arranged when the weight determining machines have two or more net weight compartments functioning in unison is illustrated in Fig. 14. In the diagram illustrated in Fig. 14, there is a tare weight compartment TW1 and two net weight compartments NW1 and NW2; the net weight compartments function in unison. Two (as illustrated in Fig. 14) or more net weight compartments can be arranged to function in unison, as mentioned before herein, to increase the capacity of the weight machine. In the application as illustrated in Fig. 14, fluid under pressure enters the piping system at FP. The stop valve ST1 is opened to permit the fluid under pressure to enter the tare weight compartment TW1 of the machine W1 by way of the adjustable constant pressure valve CPT1 and the restriction RT1. The fluid pressure in the tare weight compartment causes the central portion of the machine with the ingredient container supported by said thrust unit 23A connected to said central portion to rise. This rising motion opens the automatic valve AV1 and the fluid under pressure escapes by way of the three-way valve T (positioned as illustrated) and the automatic valve AV1; however, the escape of the fluid under pressure through the automatic valve is restricted by the tare weight on the machine; this restriction causes a pressure to be built up in the tare weight compartment that is proportional to the tare weight on the machine. The pressure thus built up is read on the tare weight indicator IT1, which is calibrated in units of weight. It is to be understood that during the tare weight determining operation as described above, the net weight determining compartments NW1 and NW2 are connected to the atmosphere by way of the three-way valve 3T1, thus insuring equal pressures above and below the diaphragms of the net weight compartments. It is well that we note here that the atmospheric compartments A1A and A1B are connected to the atmosphere by way of ports through the atmospheric compartment outer wall; all atmospheric outlet are indicated thus, →A. After the tare weight has been determined as described above, the three-way valve is rotated so that the tare weight compartment outlet is blocked, see Fig. 14A, and the net weight compartments NW1 and NW2 are connected to the automatic valve AV1. The constant pressure valve CPT1 is adjusted so that the reading on the indicator IT1 is the same as it was when the tare weight compartment TW1 was connected to the automatic valve AV1. The stop valve SN is now opened and fluid under pressure enters the net weight compartments NW1 and NW2 through the restriction RN. This fluid under pressure passes through the net weight compartments NW1 and NW2, the three-way valve 3T1 and the automatic valve AV1. As the ingredient A1 is deposited in the container C1, the central portion of the weight machine is depressed; this depressing tends to close the automatic valve AV1 and restrict the free passage of the fluid under pressure. The restriction to the free passage of the fluid pressure causes a fluid pressure to be built up in the net weight compartments NW1 and NW2; this built up pressure, which is always proportional to the net weight on the machine, is indicated on the net weight indicator IN, which is calibrated in units of weight. In this way, a constant indication of the net weight of the ingredient A1 in the container C1 is available to the operator.

Should the operator desire to know the gross weight of the material being weighed, it is only necessary for the operator to rotate the three-way valve so that all the weight determining compartments of the machine are connected to the automatic valve AV1 as illustrated in Fig. 14B. With the three-way valve in the position illustrated in Fig. 14B, the gross weight is indicated on the gross weight indicator IG.

Figures 14C, 15:
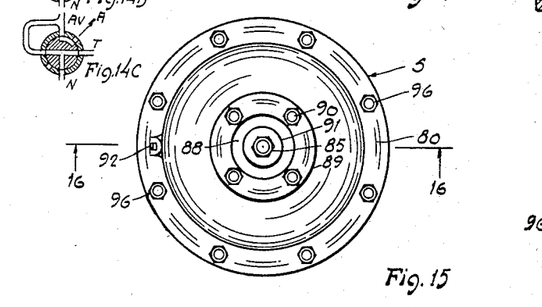
Fig. 14C is a diagram showing the position of a three-way valve when it is desired to relieve the pressure in the weight determining compartments of the weight machine.
Fig. 15 is a plan view of a snubber used in cooperation with our fluid pressure weight machines.

After the operator has determined the weights as described above, the three-way valve is rotated to the position as illustrated in Fig. 14C. With the valve in this position, all of the fluid pressure within the weight determining compartments is relieved.

Figures 16, 20, 21:
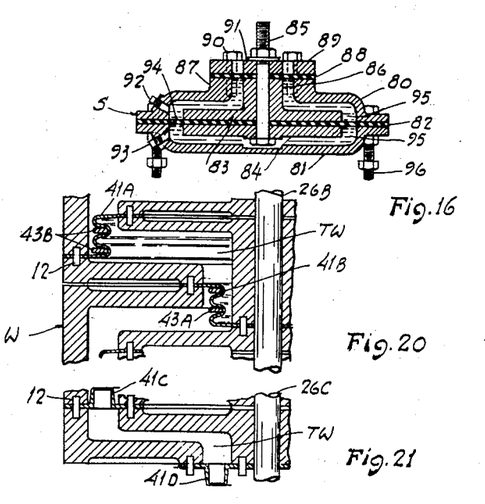
Fig. 16 is a sectional view taken along line 16—16 of Fig. 15.
Fig. 20 is a fragmental section view showing the application of a metallic diaphragm to our fluid pressure weight machine.
Fig. 21 is a fragmental sectional view showing the application of a corrugated metallic diaphragm to our fluid pressure weight machine.

In certain applications of our weight determining machines, it has proven advisable to use metallic diaphragms. Two forms of metallic diaphragms are illustrated in Figs. 20 and 21. In Fig. 20, corrugated metal diaphragms 41A and 41B are employed. These diaphragms are of corrugated metal with tension rings 43A and 43B interfitting with the convolutions of the diaphragms to provide resistance to the fluid pressure in the weight determining compartment TW. The diaphragms 41A and 41B are clamped between the body portions and central portions of the machine where they are further secured by a multiplicity of pins 12.

In Fig. 21, U-shaped metal diaphragms 41C and 41D are employed. The U-shaped portion of these diaphragms provide for greater flexibility and more accurate weight determining. The diaphragms 41C and 41D are clamped between the body portions and central portions of the machine where they are further secured by a multiplicity of pins 12.

The reason for the diaphragms 41C and 41D is that we have an inbuilt flexure which takes an eccentric load in order to keep the stem or shaft 26C vertical. The load can be placed at any point and the force will be transmitted vertically.

It is an inherent characteristic of devices that employ a compressible fluid under pressure as a supporting means, to have the supported object or objects oscillate when the quantity of weight is changed. This characteristic is present in some of the applications of our weight determining machine. Where necessary, and in order to overcome this objectionable oscillation, we use our weight determining machine in cooperation with a snubbing device. This snubbing device, generally designated S, is illustrated in Figs. 15 and 16 and is comprised of an upper body portion 80 and a lower body portion 81. The body portions define a cavity within the unit. Clamped between the upper body portion 80 and the lower body portion 81 is a flexible diaphragm 82, which divides the cavity within the unit into two cavities. Secured to the center of the diaphragm 82 is a flange unit 83 and plate 84; the diaphragm 82 is clamped between the flange and plate by the bolt 85. The bolt extends upward through a boss 86 on the upper side of the flange unit 83; the boss extending up through and ending flush with an upward extension 87 on the upper body portion. Across the opening in the extension 87 of the upper body portion, and in contact with the end of the boss 86, is a second diaphragm 88. The second diaphragm 88 is clamped to the end of the extension 87 by the clamping ring 89 and bolts 90; the diaphragm is also clamped to the end of the boss 86 by the collar 91 and bolt 85. The two cavities within the snubbing unit S, the one above the diaphragm 82 and the one below said diaphragm are filled through filling holes 92 and 93 with a fluid 95 that is highly resistant to compression (liquid in nature). A very small hole 94 in the inner diaphragm 82 permits limited and restricted flow of the fluid between the two compartments.

Figure 18:
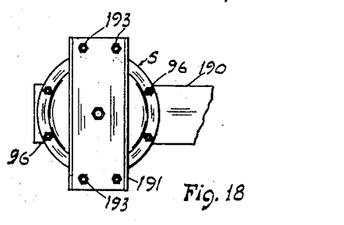
Fig. 18 is a plan view showing an application of our fluid pressure weight machine and snubbing device.
Figure 19:
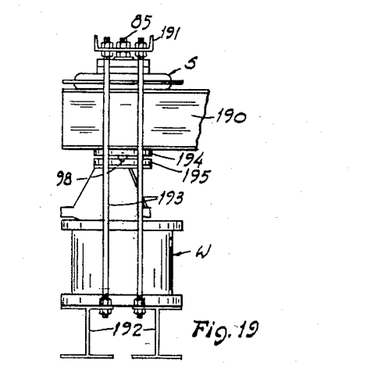
Fig. 19 is an elevational view of an application of our fluid pressure weight machine and snubbing device.

An arrangement for the mounting of our weight determining machine W and the snubbing device S is illustrated in Figs. 18 and 19; Fig. 18 being a plan view and Fig. 19 being an elevational view. In the application illustrated, an I beam 190 is utilized to apply the weight being determined to the weight machine W. The snubber S is securely fastened to the top of the I beam 190 by the securing bolts 96. A channel section 191 is positioned across the top of the snubber S and secured by nuts to the clamping bolt 85; the channel 191 is secured in definite vertical spaced relationship to the weight determining machine W supporting I beams 192 by the rods 193. Positioned between the underside of the weight applying beam 190 and the weight transmitter 23 of the weight determining machine W are companion plates 194 and 195. The upper companion plate 194 has a cone-shaped recess in its underside and the lower companion plate 195 has a cone-shaped recess in its upper side. A steel ball 98 is positioned between the companion plates interfitting with the cone-shaped recesses in the companion plates. The tie rods 193 have their nuts adjusted so that the diaphragms 82 and 88 of the snubber S are in a neutral position. With the snubber S and weight determining machine W set up in this manner, any sudden change of weight imposed on the weight determining machine that would tend to oscillate the central portion of the weight determining machine is snubbed out by the snubber S.

Figure 26:
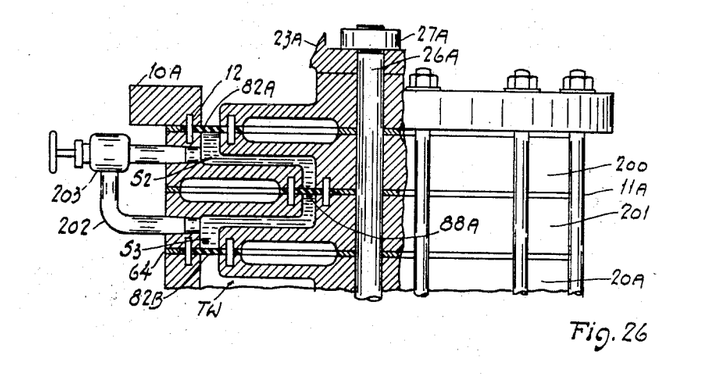
Fig. 26 is another modification of our invention wherein an external adjusting valve may be used for varying the dampening effect.

In Fig. 26 I show apparatus whereby the dampening effect may be controlled or varied by an adjustable valve. As an illustration, in Fig. 26 two chambers 200 and 201 are connected by a conduit or tubing wherein there is a valve 203. The atmospheric chamber, the tare chamber, and the net weight chamber are of the type located beneath the dampening chambers 200, 201 defining cavities S2 and S3. The tare and weight chambers are located and constructed analogous to those shown in Fig. 7.

The two cavities S2 and S3 are filled with fluid highly resistant to compression and an opening through the valve permits limited and restricted flow of the fluid between the two cavities. Hence, the dampening effect may be externally controlled and the snubbers are built in with the weighing machine.

Although our invention has been described in considerable detail, such description is intended as illustrative rather than as limiting, as the invention may be variously embodied, and the scope of the invention is to be determined as claimed.

We claim as our invention:

1. A weighing machine comprising a housing having a plurality of separately divided internally located air chambers, a plurality of diaphragms which divide said housing into said air chambers, one of said chambers being a tare weight air chamber, another chamber being the net weight chamber, an atmospheric air pressure chamber interposed between said tare weight chamber and said net weight chamber, and means for supplying air under pressure to the chambers, entrances to each of said air chambers, a platform on which a container and its contents may be weighed, a stem connected to said platform, said diaphragms flexibly connected to said stem and said diaphragms adapted to move in unison with said stem, a pressure relief nozzle connected to said net weight chamber, means controlled by said platform whereby when a weight or force is applied to said platform said nozzle closes so that the air pressure increases in the net weight chamber until this pressure multiplied by the effective area of the diaphragm equals the weight of the platform and stem, and when the weight on said platform is decreased said means permits the pressure relief nozzle to open thereby exhausting air from the net weight chamber until, at the balance point, the pressure multiplied by the effective diaphragm area again equals the weight, said tare weight chamber being air loaded to counterbalance the permanent platform weight so that only the net weight is measured.

2. A fluid pressure actuated weight determining machine comprising a tare weight and a net weight compartment operating as a unit with an atmospheric compartment interposed between said tare and net weight compartments, said tare weight compartment cooperating with a motion actuated fluid pressure regulating valve and an indicater to indicate the tare weight of an article placed upon the weight determining machine comprising a source of fluid under pressure, a base member, an upper ring member, an upper cylindrical body portion, a lower cylindrical body portion, said upper and lower cylindrical body portions located between the upper ring member and the said base member, each of said cylindrical members having an inwardly projecting circular flange, a platform, a rod attached to said platform, a plurality of discs mounted on said rod, a flexible diaphragm joined to said discs, said upper cylindrical body portion, said lower cylindrical body portion and said base thereby dividing said machine into said net weight, atmospherc pressure, and tare weight compartments, and ingress and egress passageways in each of said compartments, means mounted upon said platform and connected to each compartment whereby air pressure from each compartment may be released by the elevation of said platform by force of fluid pressure in said compartments.

3. The invention of claim 2 wherein flexible thrust units are held by said body portions and said discs whereby said platform and said rod move substantially in a linear direction even though an eccentric weight or force may be imposed thereon.

4. A fluid pressure actuated weight determining machine comprising a base member, an upper ring member, an upper cylindrical body portion, a lower cylindrical body portion, said upper and lower cylindrical body portions located between the upper ring member and the said base member, means to hold said ring member, said upper and lower cylindrical body portions and said base member rigidly together, each of said cylindrical members having an inwardly projecting circular flange rigidly fixed thereto, a platform, a rod attached to said platform, a plurality of discs mounted upon said rod, a plurality of flexible diaphragms joined to said discs, said upper cylindrical body portion, said lower cylindrical body portion, and said base member thereby dividing said machine into net weight, atmospheric pressure, and tare weight compartments, said compartments being air-tight with respect to one another, ingress and egress passageways in each of said compartments, means mounted upon said platform and said upper ring member whereby air pressure from each net weight and tare weight compartment may be released by the movement of said platform by force of fluid pressure in said compartments, the effective area of each disc in said tare weight and said net weight compartments being greater in upward direction for the air pressure to be effective than in the lower or downward direction.

References Cited in the file of this patent

UNITED STATES PATENTS

| | | |
|---|---|---|
| 397,173 | Dixon | Feb. 5, 1889 |
| 566,698 | Raab | Aug. 25, 1896 |
| 1,968,988 | Bousfield | Aug. 7, 1934 |
| 1,992,343 | Ahnstrom | Feb. 26, 1935 |
| 2,024,400 | Williams | Dec. 17, 1935 |
| 2,125,483 | Blanchard | Aug. 2, 1938 |
| 2,357,272 | Tate | Aug. 29, 1944 |
| 2,404,512 | May et al. | July 23, 1946 |
| 2,451,451 | Tate | Oct. 12, 1948 |
| 2,550,672 | Chyba | May 1, 1951 |
| 2,608,371 | McMahon et al. | Aug. 26, 1952 |
| 2,613,927 | Demas | Oct. 14, 1952 |
| 2,627,919 | Lindahl | Feb. 10, 1953 |
| 2,673,082 | Thurston | Mar. 23, 1954 |

FOREIGN PATENTS

| | | |
|---|---|---|
| 513,561 | Germany | Nov. 29, 1930 |